Nov. 5, 1968   L. KRAUS   3,408,994
INTERNAL-COMBUSTION ENGINE
Filed May 5, 1966   2 Sheets-Sheet 1

Ludwig Kraus
INVENTOR.

BY Karl G. Ross
Attorney

Nov. 5, 1968  L. KRAUS  3,408,994
INTERNAL-COMBUSTION ENGINE
Filed May 5, 1966

Ludwig Kraus
INVENTOR.

BY
Karl G. Ross
Attorney

United States Patent Office 3,408,994
Patented Nov. 5, 1968

3,408,994
INTERNAL-COMBUSTION ENGINE
Ludwig Kraus, Jahnstrasse 7, Wettstetten,
near Ingolstadt, Germany
Filed May 5, 1966, Ser. No. 547,914
Claims priority, application Germany, May 6, 1965,
A 49,125
5 Claims. (Cl. 123—191)

ABSTRACT OF THE DISCLOSURE

An internal-combustion engine whose cylinder head is formed with intake and exhaust passages opening tangentially into the cylinder compression chamber for inducing a vortex movement of fuel-air mixture and exhaust gases therein, the passages being provided with valve plates and being curved away from the compression chamber while having imaginary extensions intersecting at a point within the compression chamber; a spark-plug is mounted in the cylinder head at a location diametrically opposite this point across the compression chamber.

My present invention relates to an internal-combustion engine and, more particularly, to a valve-and-cylinder arrangement for spark-ignition internal-combustion engines.

It has been proposed heretofore to provide spark-ignition internal-combustion engines with intake and exhaust passages designed to improve the distribution of the fuel/air mixture in the cylinder and such arrangements have been found highly advantageous to prevent spontaneous or irregular ignition of the fuel/air mixture and thereby reduce "knocking" of the engine. The efficiency of an internal-combustion engine with timed spark ignition increases with increasing compression within the cylinder and a higher proportion of the fuel is converted into mechanical work at these high compressions; conversely, a reduced fuel economy characterizes lower compressions of the fuel/air mixture. It has, however, been found that the movement of the fuel/air mixture into the cylinders of such earlier internal-combustion engine involves some difficulties, primarily derived from the special shapes of the intake passages necessitated by the homogenizing movement. Thus, for example, the intake passages provided heretofore are characterized by a relatively high flow resistance to the passage of the fuel/air mixture and, since flow-resistance losses increase with the volume-rate of displacement, these losses are more significant at higher speed of the engine and the torque available at higher speeds is proportionately reduced. In practice, moreover, it has been found that the peak efficiency and peak output of internal combustion engines provided with earlier homogenization inducing intake passages is reduced by comparison with internal-combustion engines having the usual intake passages.

It is, therefore, the principal object of the present invention to provide an internal-combustion engine of the timed-ignition type, i.e. wherein the firing of the fuel/air mixture in each cylinder is produced by a spark generated in a timed sequence via a distributor or the like, in which the disadvantages of earlier internal-combustion engines are avoided, a high rotary speed with relatively high torque can be sustained, and a reduced fuel consumption is obtainable.

Another object of this invention is to provide an internal-combustion engine with good fuel economy and a high peak efficiency.

These objects and others, which will become apparent hereinafter, are attained, in accordance with the present invention, with an internal-combustion engine having at least one and generally a plurality of cylinders, each provided with a respective piston, and a cylinder head defining with each cylinder a compression chamber axially aligned therewith; the cylinder head is provided with an intake passage and an exhaust passage communicating with each of the compression chambers, with the intake passage opening tangentially into the latter. The intake and exhaust passages are provided with respective valves which may be of the tappet or tulip type at the mouth of the respective passage. The passages are so arranged that the portion of the gap between the open valve and the respective valve seat at the mouth of the passage, which lies behind the valve shaft in the direction of flow of the air/fuel mixture, is traversed by this mixture without substantial change of direction or deviation. Approximately during the last two-thirds of the intake stroke, the kinetic energy of the air/fuel mixture flowing through the intake channel supplements the flow of gases through the valve gap or clearance mentioned above and behind the valve stem and generates therewith a vortex in the respective engine cylinder. The portion of the gap lying forwardly of the valve shaft cannot, because of the change of direction of the fuel/air mixture, suppress the effectiveness of the kinetic energy of the mixture drawn into the cylinder which energy is converted into a cyclonic movement of the mixture, and thus controls only a reduced or limited proportion of the fuel/air flow. The result is an intensive vortex movement of the combustible mixture around the axis of the cylinder and a correspondingly uniform distribution of the fuel throughout the air in the compression chamber. All of the components of the fuel/air mixture are homogeneously distributed throughout the chamber so that the composition of the combustible mixture at all places in the cylinder chamber is identical and, therefore, the ignition characteristics and combustibility of the mixture at all locations in the chamber are substantially the same. Of equal or greater significance is the fact that the vortex distribution of the fuel/air mixture and the homogeneous composition of the combustion chamber above the piston increases the flame-propagation rate and burning speed and contributes to a dislodging of contaminants which could cause knocking and also reduces the tendency toward such knocking because of the reduced possibility for irregular combustion.

According to a further feature of this invention, the intake and exhaust passages both open into the compression chamber in such manner that their imaginary extensions into the combustion chamber intersect within the combustion chamber at a location offset from the axis thereof and corresponding to a common tangent of both passages to a circle whose diameter is less than that of the cylinder but which is centered upon the axis thereof. By means of this arrangement, the exhaust movement of the spent gases creates during the exhaust stroke of the engine a vortex movement about the axis of the cylinder; this vortex movement is maintained at the commencement of the intake stroke and serves to induce an initial turbulent and cyclonic movement of the fresh fuel/air mixture as the latter is drawn into the compression chamber past the intake valve. Thus the gases within the compression chamber between the end of the exhaust stroke and the beginning of the intake stroke can already be considered as having a rotary movement which is reinforced by the tangential introduction of the fuel/air mixture into the compression chamber by the intake arrangement described above. This vortex movement is augmented when in accordance with this invention, the compression chamber defined between the end of the cylinder and the piston is an axially symmetrical chamber whose walls can be considered a surface of revolution about the cylinder axis. The rotationally symmetrical compression chamber is advantageously defined between a concave cylinder end wall and a concave piston end wall such that the compression chamber is substantially ellipsoidal.

It has also been found to be highly advantageous to provide the outer wall adjacent the mouth of the intake passage of a concave configuration to generate a rotary movement in the fuel/air mixture as the latter passes through the valve gap around the valve plate. Thus the fuel/air mixture receives a rotary component of movement even while it is passing through the gap, and it has been further observed that the rotary movement can be effectively transmitted to the gases within the compression chamber when the intake channel itself is somewhat curved along a spiral; the spiral arc is, however, kept to a minimum so that the rotary component imparted to the fuel/air mixture and by this mixture to any residual gases within the compression chamber is transmitted without constriction of the flow cross-section and, therefore, without creating any significant flow resistance to the fuel/air mixture passing into the compression chamber. The vortex action generated by the tangential introduction of the air/fuel mixture from the intake passage is thus supplemented by an additional rotary component resulting from the spiral configuration of this passage.

According to still another feature of the invention, the intake passage is provided with a convex inner wall whose projection upon the intake-valve plate cuts across the latter along a secant. This arrangement also ensures an additional rotary movement of the fuel/air mixture and supplements the tangential introduction thereof in creating a vortex of the gases about the axis of the cylinder.

While reference has been made herein only to a single cylinder, it will be understood that the present invention applies to conventional internal-combustion engines having one or more rows of such cylinders each of which is provided with a respective intake passage and a respective exhaust passage, the intake passages and the exhaust passages of each row of cylinders being connected together by intake and exhaust manifolds, respectively. It has been found to be especially desirable when the cylinder head of the engine is provided with hemispherical concavities for defining the compression chambers in axial alignment with the respective cylinders and especially for cylinder heads in which the valve shafts or shanks include relatively large angles with the axes of the respective cylinders, to provide the intake channels, which open tangentially into the respective cylinders, such that they lie in planes perpendicular to the cylinder axes. Thus the kinetic energy of the fresh fuel/air mixture passing through the intake channel can be directed mainly through the valve gap behind the stem in an efficient manner and thereby exploited to generate the vortex within the cylinder. In order to reduce the open time of the exhaust valve, the exhaust channel can, in accordance with this invention, extend generally radially from the compression chamber so that the combustion gases are withdrawn principally from the central portion of the combustion chamber while the flash charge (fuel/air mixture) is introduced tangentially about the periphery of the combustion chamber and a relatively large quantity of the fresh mixture can be introduced in the region surrounding the mouth of the exhaust passage before there is any tendency for the fresh mixture to be withdrawn with the exhaust gases.

The intake and exhaust passages of each cylinder may, in accordance with the principles of the present invention, include an angle between their relatively long inner walls within which the spark plug is disposed. Thus the spark plug may be positioned at a location in the compression chamber diametrically opposite that at which the imaginary extensions of the intake and exhaust passages intersect, whereby the vortex movement of the air/fuel mixture must be assimilated into any residual gases within the combustion chamber and homogenize in the vortex before contacting the electrodes of the spark plug. This arrangement has been found to greatly reduce any tendency of the fuel to deposit upon the electrodes of the spark plugs and thus diminish the formation of soot, scale or carbon deposits thereon during firing.

The above and other objects, features and advantages of the present invention will become more readily apparent from the following description, reference being made to the accompanying drawing in which.

Figure 1:
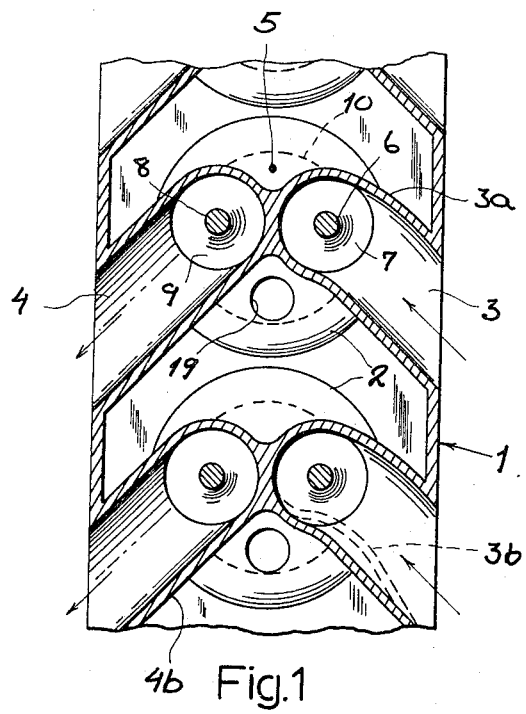
FIG. 1 is a cross-sectional view through the cylinder head of an internal-combustion engine embodying the invention, the view being taken along a plane perpendicular to the valve shafts and diagrammatically illustrating some aspects of this invention.

In FIG. 1 of the drawing, I show a cylinder head 1 whose compression chambers 2 are axially aligned with respective cylinders (not represented in FIG. 1) and are substantially of hemispherical and downwardly concave configuration and correspond to surfaces of rotation centered on the common axis of the compression chamber and the respective engine cylinder. The concavity of the compression chamber can be similar to that illustrated in FIGS. 2 and 3. A respective intake passage, lying generally in a plane perpendicular to the axis of the cylinder (i.e. corresponding to the plane of the paper) extends between a conventional intake manifold (not shown) and the respective compression chamber 2 while opening into the latter tangentially and having an arcuate concave outer passage wall adapted to impart a rotary component to the fuel/air mixture drawn to the respective intake passage. This concavely bent inner surface of 3a of the outer wall of each of the intake passages is generally spirally turned with respect to the axis of the cylinder and the compression chamber in the direction in which the fuel/air mixture is tangentially introduced. Concurrently or alternatively, the added rotary component of the movement of the fuel air mixture drawn to the respective intake passage. convexly curved inner wall 3b whose projection (represented by broken lines in FIG. 1) onto the valve plate 7 cuts across the latter in the manner of a secant. An exhaust passage 4 extends tangentially from each compression chamber and connects it with an exhaust manifold which is also conventional and not illustrated. The intake and exhaust passages 3 and 4, respectively, assigned to each of the compression chambers 2 are so arranged that their imaginary extensions into the compression chamber intersect at a region 5 shown as a point and representing the intersection of the axes of the intake and exhaust passages. As previously mentioned, this arrangement ensures that the tangential outflow of the exhaust gases or combustion products of the explosion in each cylinder will induce a rotary movement of the gases in the compression chamber about the common axis of the compression chamber and the cylinder formed in the engine block therebelow. This initial rotary movement constitutes a preliminary vortex and cyclonic movement which facilitates the vortex homogenization of the fuel/air mixture introduced tangentially from the intake passage upon the opening of the intake valve during the intake stroke. The curved configuration of the outer wall 3a and/or the inner wall 3b of the intake passage ensures an additional and augmenting rotary movement of the gases.

The intake valve 7 and the exhaust valve 9 are provided, in the embodiment of FIG. 1, with respective shanks, shafts or stems 6 and 8 which extend parallel to the axis of the cylinder. The cylinder is disposed in the usual manner below the compression chamber 2 while the broken line 10 represents a piston combustion chamber formed by a concavity in the piston which is also rotationally symmetrical with respect to the axis of the cylinder.

In the operating engine, the burned gases are forced during the exhaust stroke out of the cylinder and its compression chamber 2 tangentially through the exhaust passage 4 and produces thereby toward the end of the exhaust stroke a rotary movement of the gases within the compression chamber. Upon opening of the intake valve 7 and substantially simultaneous closure of the exhaust valve 9, the fuel/air mixture is induced into the combustion chamber 2 and has its kinetic energy at least partially converted into a rotary component of movement in the same sense by virtue of the convex wall 3b or the concave wall 3a of the intake passage and by virtue of the tangential introduction of the mixture. This rotary component supplements the rotary component produced by the exhaust gas flow. The vortex movement of the air/fuel mixture in the cylinder and the compression chamber 2 can be augmented by the provision of the rotationally symmetrical piston combustion compartment 10 which permits the rotary movement to continue until the piston is well advanced into the compression stroke. The mixture at the end of the compression stroke can, as will be seen in greater detail hereinafter, be compressed to a greater extent at the periphery or edge of the piston than in the concave burning combustion compartment and thus reduces the tendency toward knocking in the interior of the compression chamber.

Figure 2:
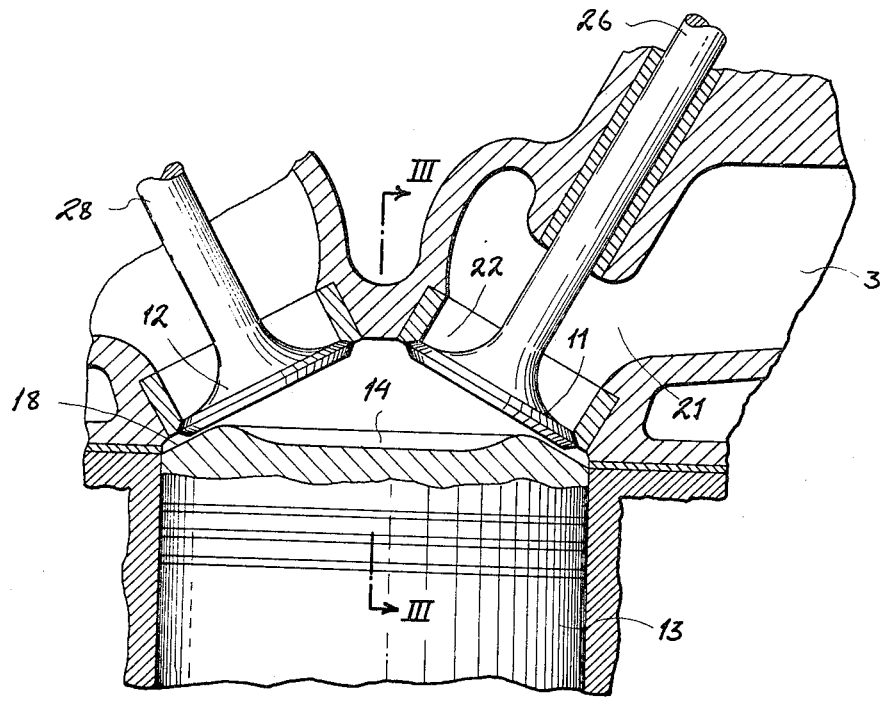
FIG. 2 is a vertical fragmentary cross-sectional view through a portion of the cylinder of an internal-combustion engine provided with a compression chamber and valve arrangement in accordance with a modified arrangement of the system of my invention.
Figure 3:
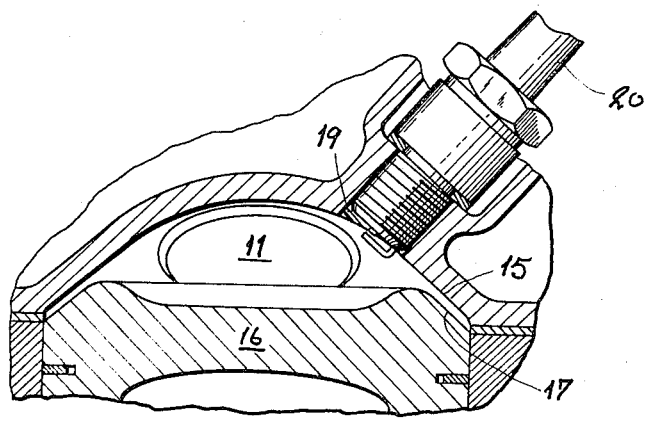
FIG. 3 is a cross-section along the line III—III of FIG. 2.

In the embodiment illustrated in FIGS. 2 and 3, the stems or shafts 26 and 28 of the intake valve 11 and the exhaust valve 12 are inclined inwardly toward one another and include angles with the cylinder axis. In fact, the axes of the valve and the cylinder can intersect at a single point. In this manner it is possible to make the plates of the intake and exhaust valves 11 and 12 with somewhat larger diameters and thus increase the opening through which the fuel/air mixture and the opening through which the exhaust gases can pass. With the same valve stroke, therefore, the valve gap is increased and the quantity of fuel/air mixture which can pass (per unit of time) is augmented and the filling of the cylinder at high engine speed with the combustible mixture is increased. When the angle included between the axes of the shafts of the valves with the axis of the cylinder are substantially as illustrated in FIG. 2 (e.g. about 30°), or when the compression chamber forms a hemispherical head for the cylinder, the intake passage can be substantially horizontal and at right angles to the axis of the cylinder as shown in FIG. 2. This arrangement permits the valve gap to sustain a high velocity of the vortex-inducing component of movement of the fuel/air mixture.

The piston 13 is provided with an upward concavity constituting a burning chamber or compartment 14 which is rotationally symmetrical about the cylinder axis (FIG. 2). Thus the compression chamber 2 is defined between a domed end wall of the cylinder formed in the cylinder head and the concavity 14 so that it is of generally ellipsoidal configuration. The heads of the valves 11 and 12 constitute part of the wall of the combustion chamber in the cylinder head and define with the frustoconical surface 15 of the latter a beveled annular surface surrounding and parallel to the inwardly converging frustoconical rim 17 of the piston whose end face 16 is shown in detail in FIG. 3. The frustoconical rim, as shown at 18, also extends parallel to the faces of the heads of the valves 11 and 12 (FIG. 2) between the rim of the piston and the wall of the compression chamber in the cylinder head; thus there is formed, in the advanced position of the piston (e.g. at the maximum stroke of the compression phase), a frustoconical gap which is as small as possible and indeed is only sufficiently large as to permit a slight deposition of carbon resulting from decomposition in the combustion chamber, without mechanical restriction of the compression stroke. When the wall 15 is rounded as in hemispherical compression chambers, the corresponding surfaces 17 of the piston may be similarly rounded so that the surfaces are maintained parallel to one another and the gap is of uniform cross section. The piston is formed with the generally spheroidal concavity 14 by turning it against a correspondingly curved cutting tool whose cutting edge has its axis lying along the axis of the piston.

The threaded bore 19 into which the spark plug 20 is inserted, is disposed above and along an edge of the piston concavity 14 in the compression chamber. This arrangement has been found to produce a highly compact compression chamber which ensures that the vortex movement of the gases will distribute the components of the fuel/air mixture homogeneously and scour the walls of the combustion chamber, while reducing the tendency toward engine knocking. In the arrangement of FIGS. 2 and 3, the spark plug is shown to be disposed between the longer inner walls of the intake passage 3 and the exhaust passage 4. The fresh gasoline/air mixture, drawn into the compression chamber through the valve gap of the intake channel 3, passes mainly from the left-hand side of the valve 11 (FIG. 3) in a vortex movement along the interior of the compression chamber past the exhaust valve 12 before it reaches the spark plug 20. In this manner, the fuel-saturated fresh mixture is homogenized and the fuel droplets dispersed or vaporized before the mixture reaches the spark plug electrodes and thereby prevents irregular firing and reducing carbon deposition at the electrodes. The recesses 18 can be complementary to the heads of the valves 11 and 12 as illustrated in FIG. 2 so as to overlap the open positions thereof. At the end of the exhaust stroke, when the piston 13 has reached its upper dead-center position, the exhaust valve 12 can be somewhat opened while the intake valve 11 begins its opening movement.

In internal-combustion engines having a relatively small piston stroke, this arrangement permits the concavity 14 of the piston to be of reduced diameter and thereby obtain a higher compression. In the limiting case, with tangential introduction of the fuel/air mixture, it is possible to eliminate the concavity 14 in its entirety.

The fresh fuel/air mixture passes, during operation of the engine, through the intake passage 3 into the combination chamber and flows primarily in the region 22 behind the valve stem 26. Because of the relatively sharp diversion of the fresh gas stream at 21, the flow on the right side (FIG. 2) of the head of intake valve 11 is only a relatively small portion of the total fuel/air mixture so that the rotary movement of the mixture is established in the compression chamber; this vortex movement is further augmented by the tangential outflow of the gases and increases during the downward movement of the piston, being sustained even during the compression stroke. When the piston 13 approaches its upper dead point, the gas mixture flows more rapidly through the annular gap between the surfaces 17, 18 and the parallel surface 15 of the compression chamber so that the air/fuel mixture is more highly compressed in this gap than in the region of the concavity 14. Thus again an enforced cyclonic movement of the compressed gas mixture is ensured. The vortex movement sustained from the beginning of the exhaust stroke to the end of the compression stroke guarantees a homogeneous distribution of fuel and air in the time prior to the ignition and also ensures that the distribution will remain the same from cycle to cycle; irregular firing is thus eliminated. The introduction of the mixture and its combustion is effected with high efficiency even at elevated engine speeds so that a reduced fuel consumption and a higher power output are obtainable.

Figure 4:
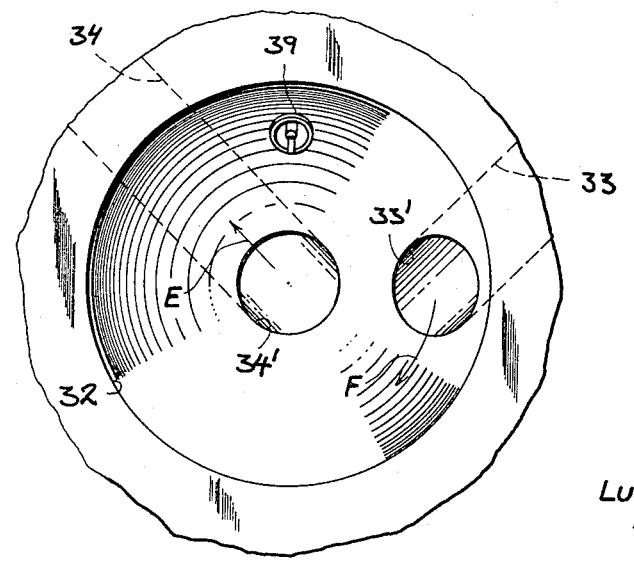
FIG. 4 is a view of the underside of a cylinder head showing one of the compression chambers from below in accordance with still another modification of this invention.

In the modification of FIG. 4, the combustion chamber 32 is formed with a central exhaust port 34' whose passage 34 extends generally radially while the intake passage 33 opens tangentially at 33' into the hemispherical combustion chamber 32. Again the spark plug 39 is disposed between the longer inner walls of the passages. In this case, a vortex movement of the fuel/air mixture (arrow F) proceeds along the outer regions of the combustion chamber while the exhaust gas is removed from the center of the vortex (arrow E). In this manner a homogeneous distribution in filling of the compression chamber can occur without danger of loss of fuel even when the exhaust valve remains open during an initial part of the intake stroke and after opening of the intake valve.

Other modifications will be readily apparent to those skilled in the art and are included within the spirit and scope of the appended claims.

I claim:
1. An internal-combustion engine comprising:
   a cylinder block having at least one cylinder, and a piston reciprocable within said cylinder;
   a cylinder head mounted on said block and formed with a compression chamber ahead of said piston in axial alignment with said cylinder, an intake passage opening tangentially into said compression chamber for delivering thereto an air/fuel mixture and inducing a vortex movement of said mixture about the axis of said cylinder, and an exhaust passage leading tangentially from said compression chamber for removing combustion products therefrom, said passages having imaginary axial extensions intersecting at a point within said compression chamber;
   an intake valve for said intake passage and an exhaust valve for said exhaust passage, said intake passage being provided with an arcuate wall proximal to the region at which said intake passage opens into said chamber for promoting the vortex movement of said mixture entering said chamber; and
   a spark plug mounted in said cylinder head and disposed at a location diametrically opposite said point across said compression chamber, said compression chamber being defined between a concavity formed in said head and open axially in the direction of said piston and a concavity formed in said piston and open axially in the direction of said head, said concavity of said piston being rotationally symmetrical about said axis.

2. The engine defined in claim 1 wherein said intake passage extends generally spirally in the region at which it opens into said chamber.

3. The engine defined in claim 1 wherein said intake passage is provided with a convex inner wall and said intake valve has a valve plate at its opening into said chamber, the projection of said inner wall lying generally along a secant of said valve plate.

4. The engine defined in claim 1 wherein said intake passage lies in a plane perpendicular to said axis.

5. The engine defined in claim 1 wherein said piston and said compression chamber are formed with spaced-apart generally parallel frustoconical surfaces defining a frustoconical clearance between them around said piston at the end of its compression stroke.

References Cited

UNITED STATES PATENTS

| 1,733,696 | 10/1929 | Ricardo | 123—30 |
| 2,254,438 | 9/1941 | McCarthy | 123—191 |
| 2,469,448 | 5/1949 | Barber | 123—191 X |
| 2,672,852 | 3/1954 | Miller | 123—191 X |
| 1,716,095 | 6/1929 | Warner | 123—55 |
| 1,815,868 | 7/1931 | Schenk | 123—55 |
| 3,154,059 | 10/1964 | Witzky et al. | 123—188 |

FOREIGN PATENTS

| 535,065 | 3/1941 | Great Britain. |
| 670,181 | 4/1952 | Great Britain. |
| 700,364 | 12/1953 | Great Britain. |
| 723,711 | 2/1955 | Great Britain. |
| 819,431 | 9/1959 | Great Britain. |

WENDELL E. BURNS, *Primary Examiner.*